(12) United States Patent
Raye et al.

(10) Patent No.: US 6,724,123 B2
(45) Date of Patent: Apr. 20, 2004

(54) DYNAMO ELECTRIC MACHINE

(75) Inventors: Gregory A Raye, Twinsburg, OH (US);
Gordon W Brunson, Chagrin Falls, OH (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 10/356,397

(22) Filed: Jan. 31, 2003

(65) Prior Publication Data

US 2003/0173856 A1 Sep. 18, 2003

Related U.S. Application Data

(60) Provisional application No. 60/353,763, filed on Jan. 31, 2002.

(51) Int. Cl.[7] ............................................. H02K 13/00
(52) U.S. Cl. ........................ 310/239; 310/242; 310/228
(58) Field of Search ............................. 310/239, 242, 310/245, 228, 240, 248

(56) References Cited

U.S. PATENT DOCUMENTS

| | | | | |
|---|---|---|---|---|
| 3,792,298 A | * | 2/1974 | Hamman | 310/242 |
| 3,894,254 A | * | 7/1975 | Holther, Jr. | 310/66 |
| 4,074,162 A | * | 2/1978 | Parzych | 310/245 |
| 4,296,346 A | * | 10/1981 | Ooki et al. | 310/242 |
| 4,309,920 A | * | 1/1982 | Rickert et al. | 81/486 |
| 4,311,936 A | * | 1/1982 | Ozaki et al. | 310/242 |
| 4,355,254 A | * | 10/1982 | Oki et al. | 310/242 |
| 4,366,403 A | * | 12/1982 | Simpson et al. | 310/239 |
| 4,800,313 A | * | 1/1989 | Warner et al. | 310/242 |
| 5,237,231 A | * | 8/1993 | Blaettner et al. | 310/239 |
| 5,463,264 A | * | 10/1995 | Koenitzer | 310/242 |
| 5,621,262 A | * | 4/1997 | Han | 310/239 |
| 5,753,995 A | * | 5/1998 | Ogino | 310/242 |

* cited by examiner

*Primary Examiner*—Thanh Lam
(74) *Attorney, Agent, or Firm*—Andrus, Sceales, Starke & Sawall

(57) ABSTRACT

A brush replacement kit for use with a dynamo electric machine of the kind having a yoke, apertures in the yoke through which brushes of the machine are accessible, and a brush holder assembly for supporting the brushes in a predetermined alignment in relation to a commutator or slip-ring assembly of the machine, the kit comprising replacement brushes of a length exceeding the length of the conventional brushes for the machine, and a cover component comprising a cylindrical band for attachment around the exterior of the yoke to close said brush access apertures in use, said band including radially outwardly extending protrusions to be positioned over said apertures of the yoke in use and thereby to accommodate the additional length of the replacement brushes.

8 Claims, 6 Drawing Sheets

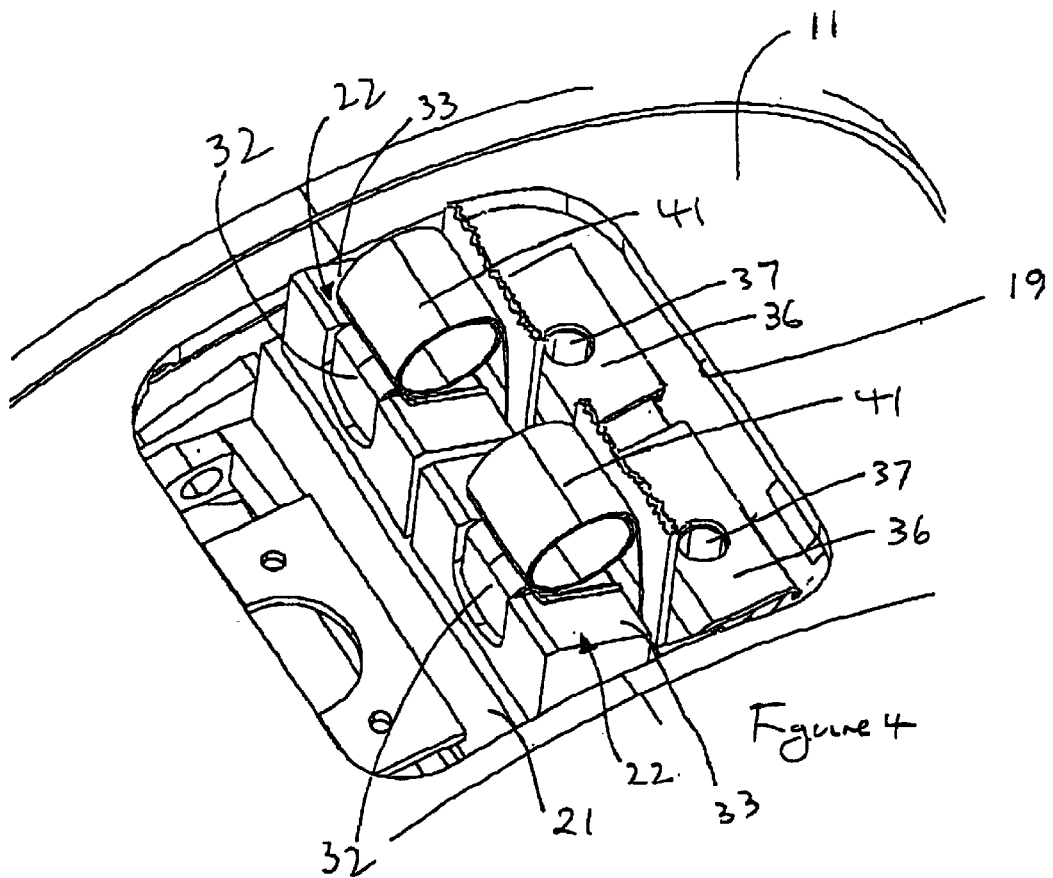
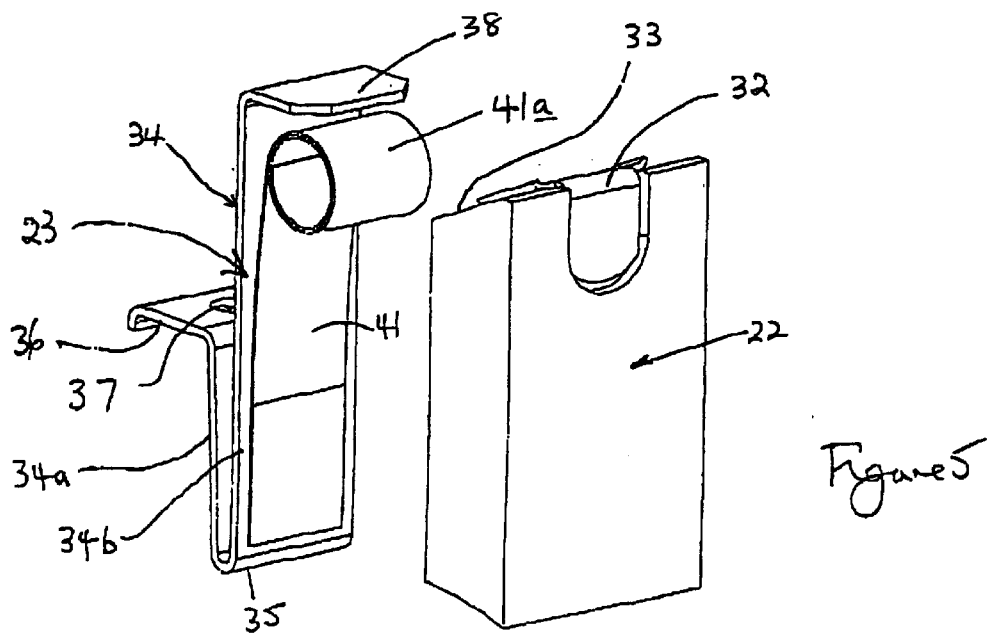

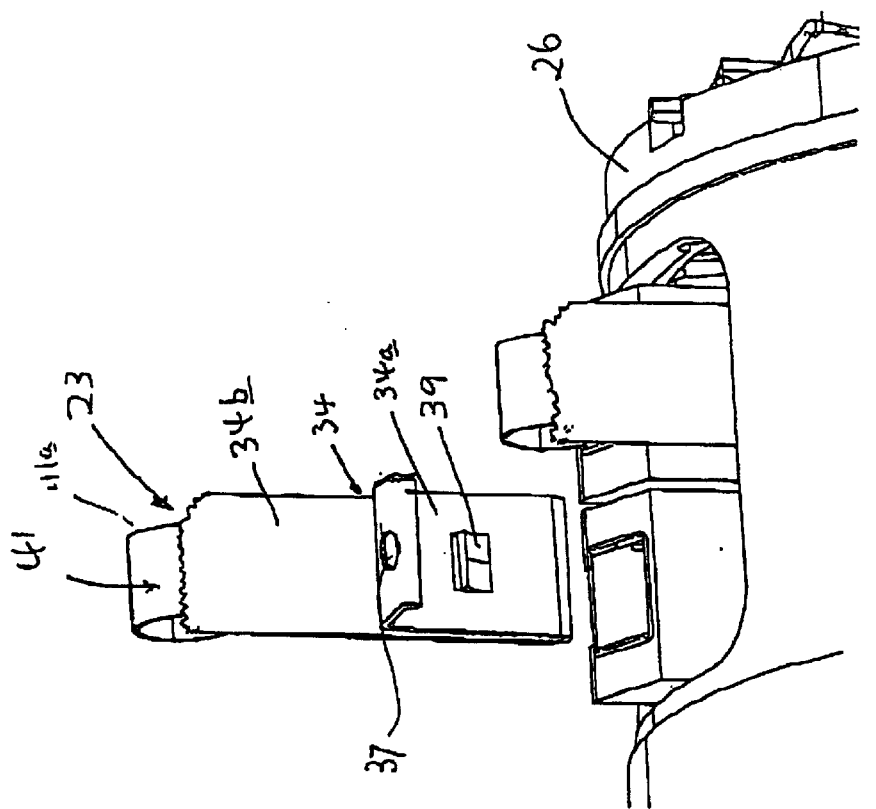
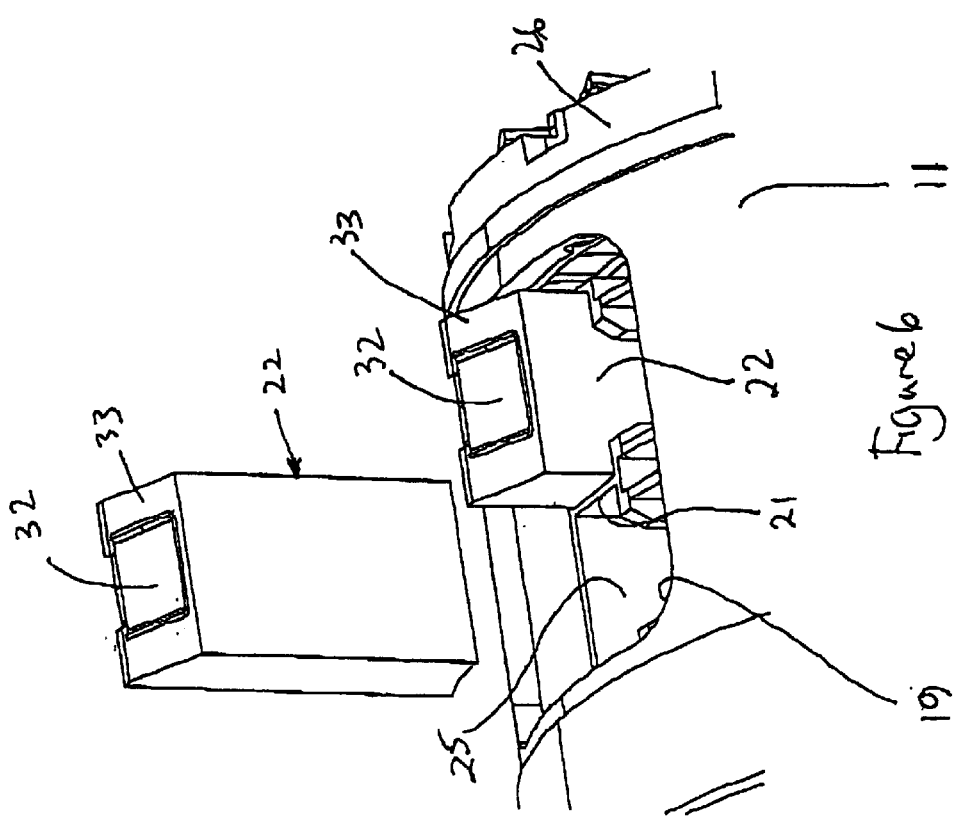

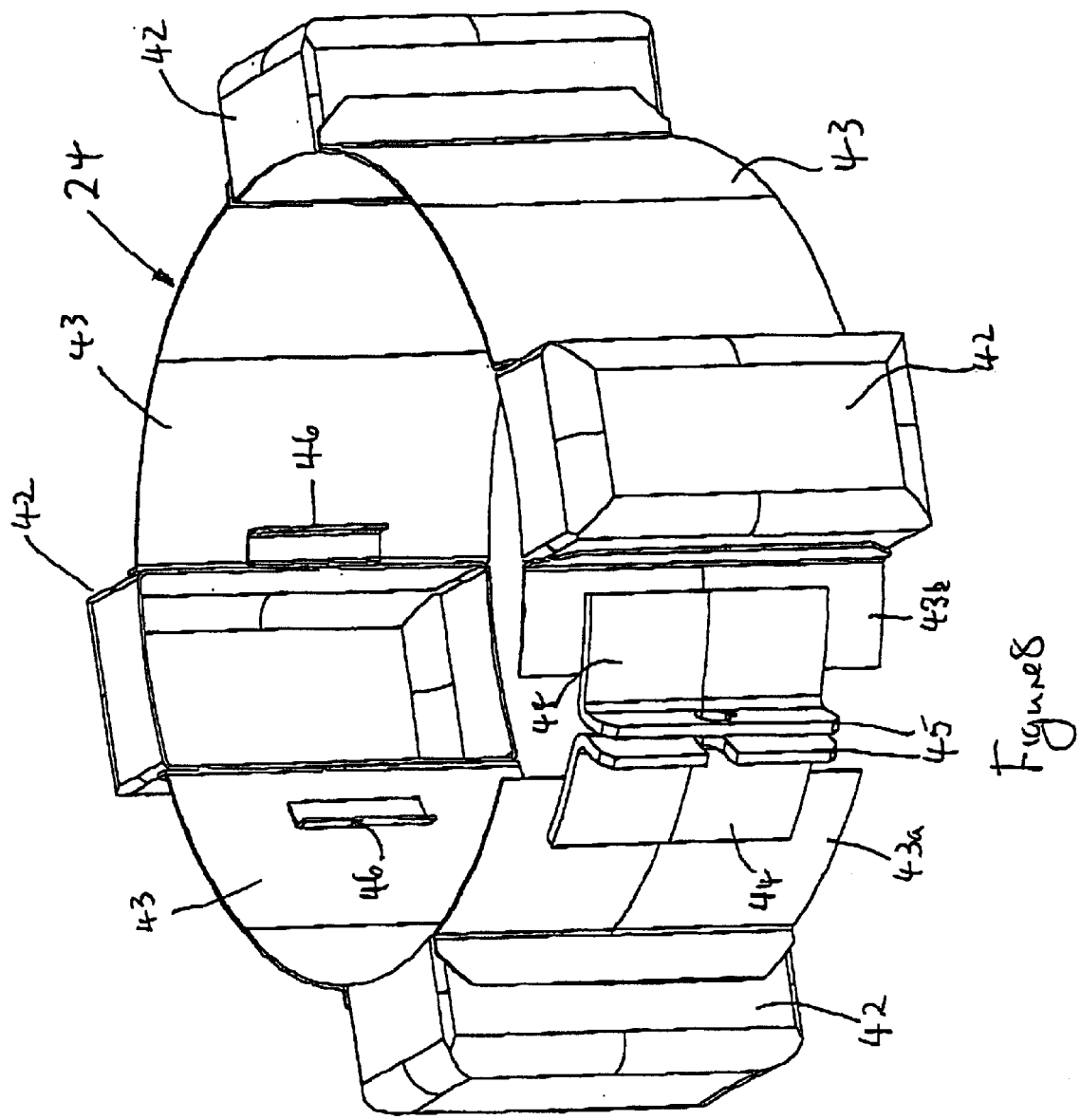

DYNAMO ELECTRIC MACHINE

CROSS REFERENCE TO RELATED APPLICATION

The present invention is based on U.S. Provisional Patent Application Ser. No. 60/353,763, filed on Jan. 31, 2002.

BACKGROUND OF THE INVENTION

This invention relates to a kit for improving the service life of a dynamo electric machine, and to a dynamo electric machine modified by the use of such a kit.

The term "service life" is used herein to indicate a recommended operational period between maintenance times at which the machine is withdrawn from service for scheduled maintenance.

The invention is particularly, but not exclusively, concerned with dynamo electric machines for use in conjunction with aircraft gas turbine engines, particularly starter-motor/generator units. The present inventor has recognised that recent improvements in the design and manufacture of such dynamo electric machines has produced a situation in which the service life is governed by the wear rate of the brushes of the machine and has recognised that if the useful life of the brushes of the machine can be extended then the service life can be extended by a corresponding amount up to the point at which the service life of some other component of the machine is reached.

SUMMARY OF THE INVENTION

In accordance with the present invention there is provided a kit for use with a dynamo electric machine of the kind having a yoke, apertures in the yoke through which brushes of the machine are accessible, and a brush holder assembly for supporting the brushes in a predetermined alignment in relation to a commutator or slip-rings of the machine, the kit comprising replacement brushes of a length exceeding the length of the conventional brushes for the machine, and a cover component comprising a cylindrical band for attachment around the exterior of the yoke to close said brush access apertures in use, said band including radially outwardly extending protrusions to be positioned over said apertures of the yoke in use and thereby to accommodate the additional length of the replacement brushes.

Preferably the kit further includes replacement springs for attachment to respective brush holders and engagable with the outer ends of the replacement brushes to urge the brushes radially inwardly of the machine in use throughout the increased wear length of the replacement brushes.

Conveniently said replacement springs comprise constant force springs together with clip means for anchoring the constant force springs to their respective brush holder.

Desirably the kit further includes replacement brush holders shaped to receive said replacement springs and said replacement brushes.

In another aspect the invention resides in a brush replacement kit for use with a dynamo electric machine of the kind having a yoke, apertures in the yoke through which brushes of the machine are accessible, and a brush holder assembly for supporting the brushes in a predetermined alignment in relation to a commutator or slip-ring assembly of the machine, the kit comprising replacement brushes of a length exceeding the length of the conventional brushes for the machine, replacement springs for attachment to respective brush holders and engagable in use with outer ends of respective replacement brushes to urge the brushes radially inwardly of the machine in use throughout the increased wear length of the replacement brushes, said replacement springs comprising constant force springs together with clip means for anchoring the constant force springs to a respective brush holder, replacement brush holders shaped to receive said replacement springs and said replacement brushes, and a cover component comprising a cylindrical band for attachment around the exterior of the yoke to close said brush access apertures in use, said band including radially outwardly extending protrusions to be positioned over said apertures of the yoke in use and thereby to accommodate the additional length of the replacement brushes.

The invention also resides in a dynamo electric machine fitted with a kit of the kind defined above.

In a further aspect of the invention there is provided a dynamo electric machine of the kind having a yoke, apertures in the yoke through which brushes of the machine are accessible, a brush holder assembly for supporting the brushes in a predetermined alignment in relation to a commutator or slip-ring assembly of the machine, brushes of a length exceeding the length of the conventional brushes for the machine, spring arrangements attached to respective brush holders and engaging with outer ends of respective brushes to urge the brushes radially inwardly of the machine in use throughout the increased wear length of the brushes, and a cover component comprising a cylindrical band for attachment around the exterior of the yoke to close said brush access apertures in use, said band including radially outwardly extending protrusions to be positioned over said apertures of the yoke in use and thereby to accommodate the additional length of the brushes.

Preferably said spring arrangements comprise constant force springs together with clip means for anchoring the constant force springs to a respective brush holder, and said brush holders being shaped to receive said constant force springs together with clip means, and said brushes.

BRIEF DESCRIPTION OF THE DRAWINGS

In the accompanying drawings:

FIG. 4 is a perspective view of part of a dynamo electric machine equipped with the brush holders of FIG. 2 containing brushes and replacement springs;

FIG. 5 is a diagrammatic perspective view of a brush and a brush spring forming part of the kit in accordance with one example of the present invention;

FIG. 6 is a diagrammatic perspective view illustrating one stage in the insertion of replacement brushes of the kit in accordance with one example of the present invention into a brush holder of the kind shown in FIG. 2 positioned within a dynamo electric machine;

FIG. 7 is a view similar to FIG. 6 illustrating a later stage in the application of the kit; and FIGS. 8 and 9 are diagrammatic perspective views of alternative yoke covers forming part of the kit in accordance with one example of the present invention.

DETAILED DESCRIPTION

Figure 1:
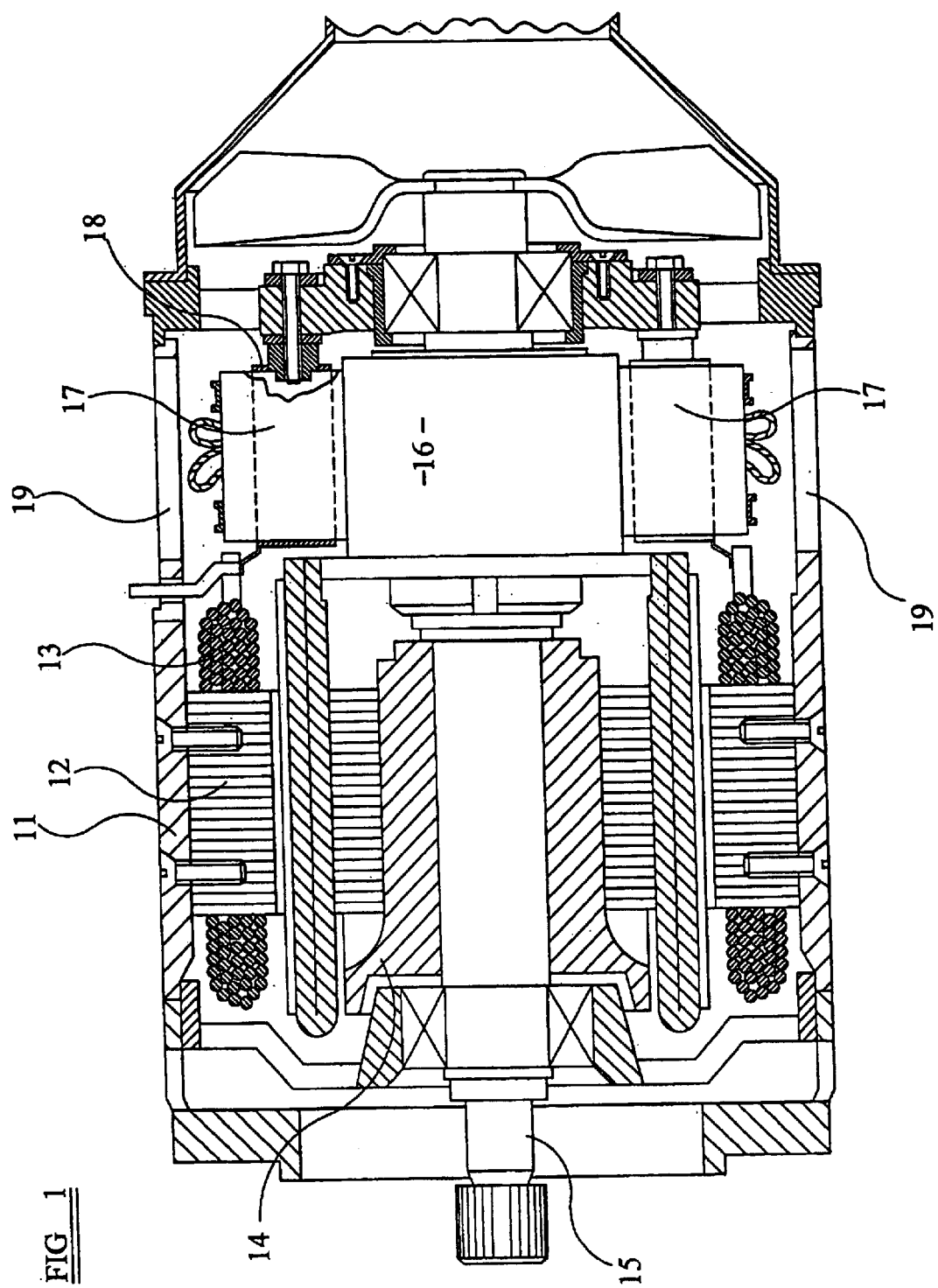
FIG. 1 is a diagrammatic cross-sectional view of a conventional dynamo electric machine.

Referring first to FIG. 1 of the accompanying drawings, it can be seen that the conventional dynamo electric machine which, in this case is a direct current motor, but could be starter-motor/generators or other similar machine, has an outer, cylindrical, ferromagnetic yoke 11 internally supporting stator poles 12 carrying stator windings 13 in known manner. Rotatable within the assembly of stator poles 12 is a rotor 14 including an elongate shaft 15 journalled at its opposite ends respectively for rotation in bearings mounted in end caps secured to the yoke 11 in use. Adjacent one end the shaft 15 carries a commutator 16 (or a slip ring assembly) engaged at spaced points around its circumference by brushes 17 slidably received in brush holders 18 electrically insulated from the case of the machine. Electrical connections are made by conductive braids or twisted strands in conventional manner to the brushes 17 and springs (not shown) urge the brushes radially inwardly to contact the commutator or slip ring assembly 16. The yoke 11 has a plurality of apertures 19 through which access may be obtained to the brush holders 18 to facilitate replacement, in a radial direction, of the brushes 17. The apertures 19 are normally closed in use by a plain cylindrical band, formed from steel or other suitable material, and clamped around the exterior of the yoke in conventional manner.

The present inventor has recognised that the longevity which can now be achieved in the component life of dynamo electric machines results in the wear rate of the brushes 17 determining the service life of the dynamo electric machine, that is to say determines the period during which the dynamo electric machine is operational between scheduled service intervals at which the brushes are replaced. The inventor has therefore recognised that by increasing the length of the brushes, in a direction generally radially of the dynamo electric machine, then the life of the brushes can be extended by comparison with brushes of conventional length as shown in FIG. 1, and thus the service life of the machine can be extended since the remaining components of the dynamo electric machine can greatly outlive the service life of the brushes 17. Accordingly the inventor has invented a kit for use at a service interval whereby increased length brushes may be accommodated without major modification to the structure of the remainder of the dynamo electric machine.

Figure 2:
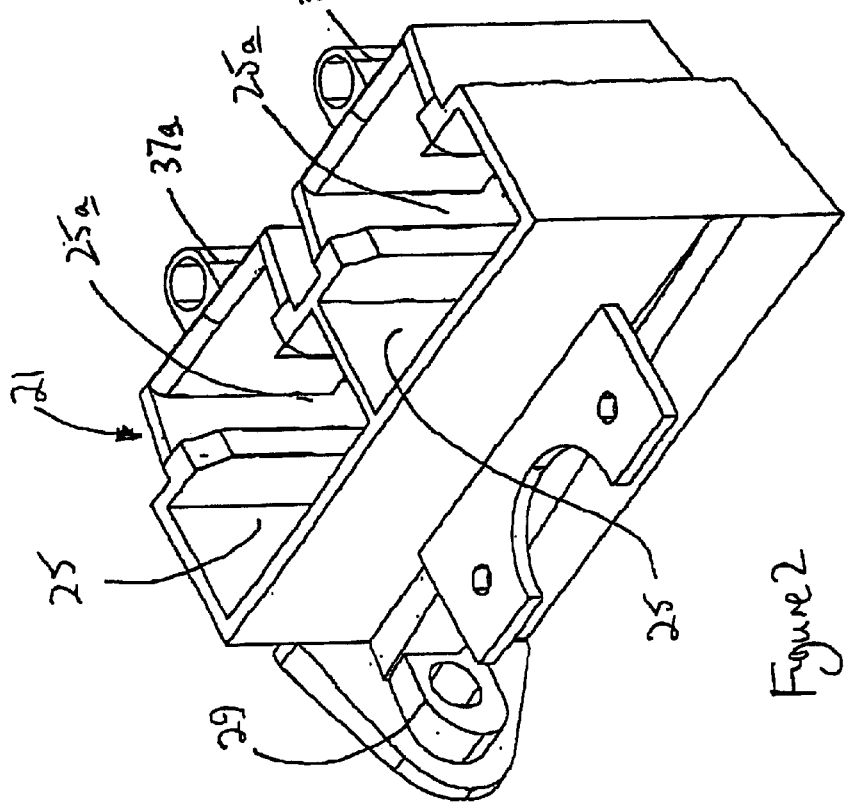
FIG. 2 is a diagrammatic perspective view of a brush holder of a kit in accordance with one example of the present invention.

Referring now to FIGS. 2 to 8 inclusive the kit comprises a plurality of replacement brush holders 21 as illustrated in FIG. 2, a plurality of extra length brushes 22, a corresponding plurality of constant force spring assemblies 23 (FIG. 5) and a cylindrical cover band 24 (FIG. 8).

Figure 3:
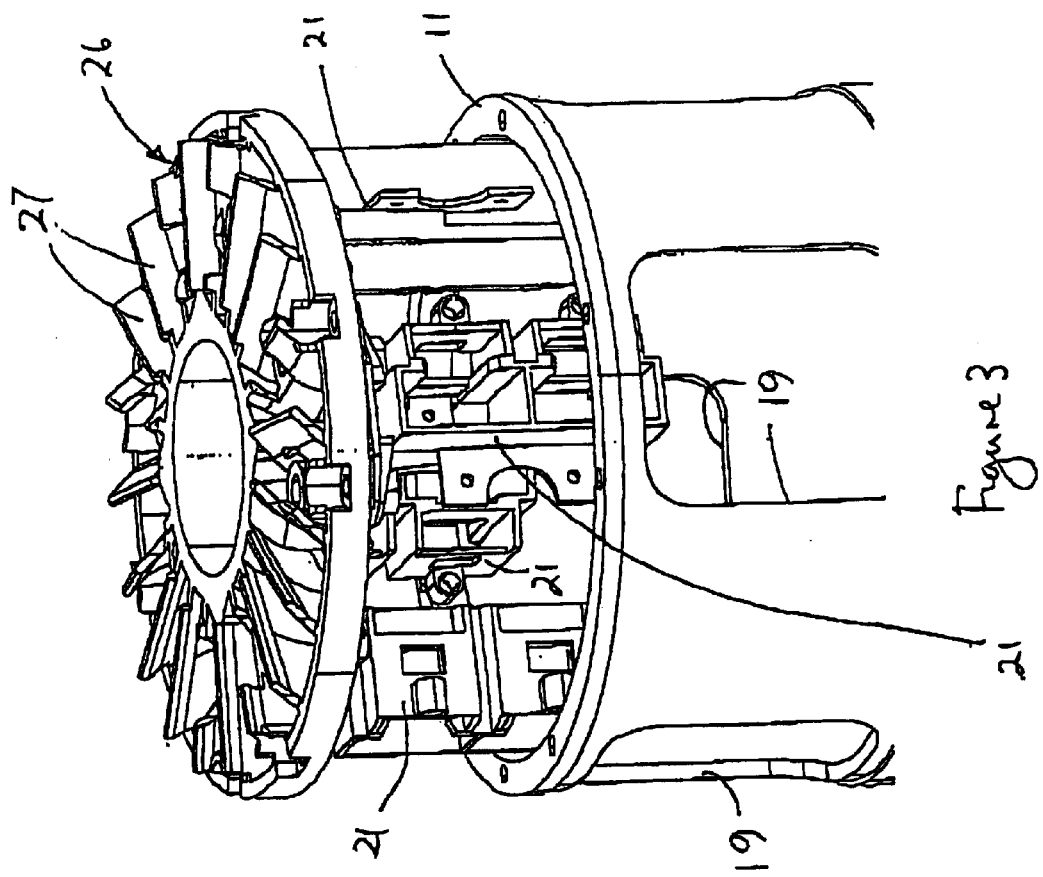
FIG. 3 is an exploded perspective view of part of a dynamo electric machine equipped with the brush holders of FIG. 2.

The dynamo electric machine illustrated in FIG. 3 has been fitted with four brush holders 21 of the kind shown in FIG. 2. Each brush holder 21 is a stainless steel casting and has through passages 25 for slidably receiving first and second brushes in use. As is apparent from FIG. 3 the dynamo electric machine includes an end cap assembly 26 having fins 27 for guiding the air flow through the yoke of the machine generated by a fan of the machine in use.

The end cap 26 is arranged to be secured to the yoke 11 of the dynamo electric machine by a plurality of axially extending screws (not shown) which pass through a peripheral ring of the end cap 26 and are threaded into the thickness of the yoke 11. The brush holders 21 are formed with integral mounting lugs 29 through which the brush holders 21 can be secured in the appropriate position, by means of screws or bolts, to the inner face of the end cap 26. Thus at a service interval of the dynamo electric machine the end cap 26 is disconnected from the yoke 11, the existing brush holders are disconnected from the end cap 26 and are discarded, and the replacement brush holders 21 are secured to the end cap. The assembly of the end cap and brush holders is then replaced on the yoke 11 and secured in position with the brush holders 21 exposed through windows 19 in the yoke 11.

Replacement brushes 22 of significantly greater length than the original brushes which they replace, are inserted into the passages 25 of the respective brush holders 21. Each brush is of rectangular cross-section and is a loose sliding fit within the passage 25 of its respective brush holder. Furthermore, at its radially outermost end each brush 22 carries a stainless steel saddle 32 connected to the conductive material of the brush and seated on an inclined end face 33 of the brush.

Associated with each brush 22 is a constant force spring and clip assembly 23 which replaces a conventional "clock spring" arrangement customarily used to urge the original brush radially inwardly. Each constant force spring and clip assembly 23 includes a clip 34 bent from stainless steel strip and comprising first and second generally parallel limbs 34a, 34b (FIG. 5) interconnected at one end by an integral bend 35. The limb 34a is shorter than the limb 34b and terminates at its end remote from the bend 35 in a perpendicular flange 36 having an aperture 37 for receiving a screw in use. The end of the limb 34b remote from the bend 35 has a perpendicular flange 38 (seen in FIG. 5 but omitted from FIGS. 4 and 7) bent to extend in the opposite direction to the flange 36. Intermediate its ends the limb 34 is formed with an outwardly projecting tongue 39 (FIG. 7). Secured to the face of the limb 34b remote from the limb 34a is an elongate constant force spring 41 in the form of an elongate strip of spring material, for example stainless steel. The strip of material forming the spring 41 is secured to the limb 34b conveniently by welding or rivetting, at a point adjacent the bend 35. The strip-like spring 41 is rolled along its length, and if unrolled, against its inherent resilience, will lie along the length of the limb 34b as illustrated in FIG. 5. However, in a rest configuration the spring 41 curls into a roll or scroll adjacent its point of connection with the limb 34b. The flange 38 overlies the scroll 41a of the spring in order to protect the spring during servicing. The flange may be coated with an electrically insulating material such as epoxy resin to reduce the risk of electrical arcing in use.

The spring and clip assembly associated with each brush 22 is introduced into the brush holder 21 after insertion of its respective brush. Each assembly is introduced between the face of the brush and the brush holder, and sits within a lateral extension 25a of the respective passage 25. Each assembly 23 is positioned with the spring 41 presented to the respective brush 22 and the scroll 41a of the spring seated on the saddle 32 of its respective brush. As each assembly is inserted into the brush holder the spring unrolls and when the assembly is fully seated in the brush holder the remainder of the scroll 41a seated in the respective saddle 32 is exerting a force on the saddle to urge the brush radially inwardly of the dynamo electric machine.

When each spring and clip assembly is fully seated in its respective brush holder the flange 36 overlies a respective lug 37a integral with the outer face of the respective brush holder and a respective securing screw (not shown) is inserted through the respective aperture 37 and into the lug 37a to clamp the flange 36 and therefore the assembly, to the brush holder. It will be recognised that as a replacement brush wears in use the respective spring rerolls under it's inherent resilience to urge the brush radially inwardly, towards the commutator or slip ring assembly, through the whole wear length of the replacement brush.

Although not apparent in the drawings the tongues 39 of the limbs 34a of the clips 34 coact with respective undercut shoulders in the brush holders 21 to retain the spring and clip assemblies 23 in position in the brush holder prior to introducing the fixing screws to the apertures 37.

It will be understood that if, when replacing the original brushes, it were possible to substitute the original "clock spring" arrangement for urging the brushes radially, with a "clock spring" arrangement suitable for the increased wear length of the replacement brushes, as may be the case in some dynamo electric machine types, then replacement of the associated brush holder would be unnecessary as a primary reason for replacing the brush holders is to provide holders which accommodate the replacement spring and clip assemblies 23.

As mentioned above the brushes 22 are significantly longer than the conventional brushes which they have replaced. As is apparent from FIGS. 6 and 7 the brushes 22 are of such a length that they protrude radially through the respective apertures 19 in the yoke 11. Similarly the limbs 34b of the clips 34 together with the scrolls of the springs 41 also protrude through the apertures 19. FIG. 8 illustrates a cover band 24 forming part of the kit, and which is attached to the exterior of the yoke 11 to close the apertures 19. As is apparent the band 24 comprises four hollow box structures 42 conveniently formed as sheet metal pressings and interconnected by three part circular metal band portions 43. The box structures 42 are positioned with their open faces presented inwardly, and are spaced apart by 90° around the common axis of the band portions 43. A further band portion 43 is divided into first and second sections 43a, 43b each of which has secured thereto a strap 44 having a radially outwardly extending flange 45. The flanges 45 can be secured together by a nut and bolt or the like so that the assembly of portions 43 and box structures 42 defines a cylindrical band. The internal diameter of the cylindrical band is equal to the external diameter of the yoke 11, and by detaching the flanges 45 from one another the band can be slid over the axial end of the yoke 11 to overlie the apertures 19. The cover band 24 is formed with internally projecting lugs 46 which engage within one or more of the apertures 19 to locate the band 24 circumferentially on the yoke 11 with the open faces of the box structures 42 disposed over the apertures 19 and therefore accommodating the protruding portions of the brushes 22 and clip assemblies 23 without touching them. Thus the box structures 42 provide protective covers overlying, but spaced from the brushes and clip assemblies.

Figure 9:
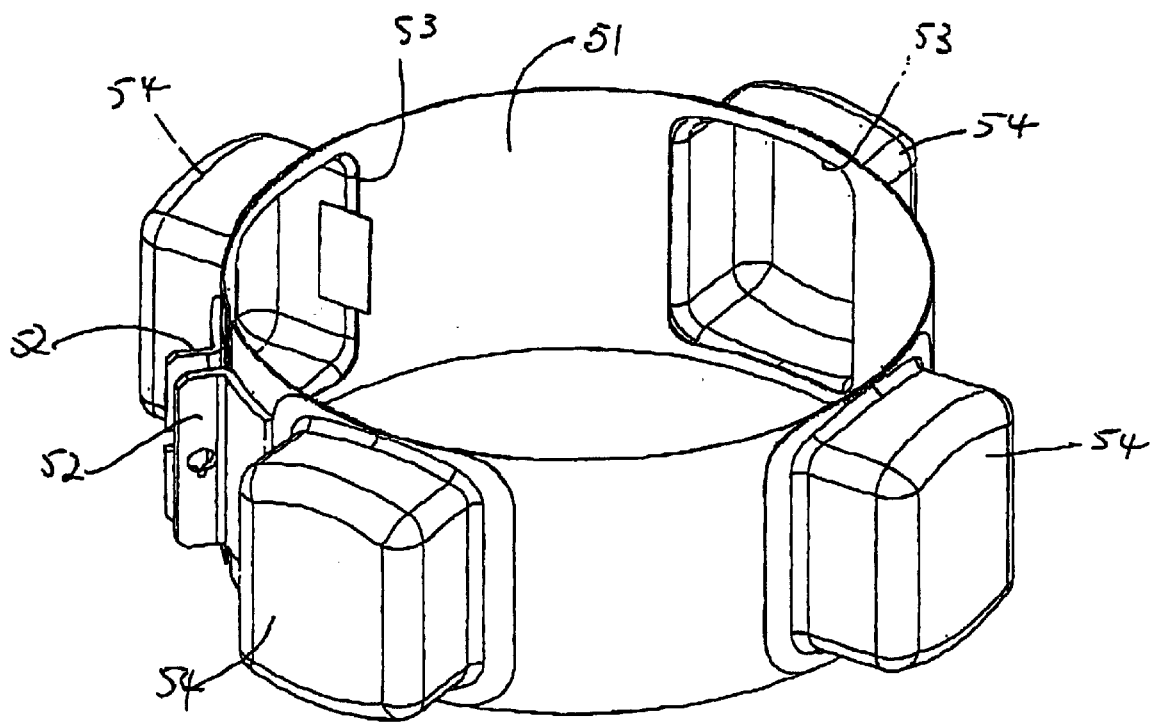

It will be recognised that the cover band 24 can be fabricated from a plurality of separately formed pressed steel strip components or, if desired, could be formed as an integral pressing in elongate strip which is then bent to a cylindrical form. If desired the cover band 24 could be formed from synthetic resin material since it adds little to the ferromagnetic properties of the yoke at the axial end of the yoke. FIG. 9 shows an alternative to the band of FIG. 8 in which a continuous strip of metal is bent to define a cylindrical band 51 the ends of which are provided with projecting lugs 52 whereby the band can be clamped around the yoke 11 using a pinch bolt or the like. At four equiangularly spaced points the band has rectangular apertures 53 closed by outwardly projecting box formations 54 which can be integrally formed in the strip of band by a pressing, stamping or deep drawing operation or which can be separately formed and then secured to the apertured band by welding or the like, the separately formed formations 54 having integral skirts to facilitate spot welding to the band.

What is claimed is:

1. A brush replacement kit for use with a dynamo electric machine of the kind having a yoke, apertures in the yoke through which brushes of the machine are accessible, and a brush holder assembly for supporting the brushes in a predetermined alignment in relation to a commutator or slip-ring assembly of the machine, the kit comprising replacement brushes of a length exceeding the length of the conventional brushes for the machine, and a cover component comprising a cylindrical band for attachment around the exterior of the yoke to close said brush access apertures in use, said band including radially outwardly extending protrusions to be positioned over said apertures of the yoke in use and thereby to accommodate the additional length of the replacement brushes.

2. A kit as claimed in claim 1 further including replacement springs for attachment to respective brush holders and engagable in use with outer ends of respective replacement brushes to urge the brushes radially inwardly of the machine in use throughout the increased wear length of the replacement brushes.

3. A kit as claimed in claim 2 wherein said replacement springs comprise constant force springs together with clip means for anchoring the constant force springs to a respective brush holder.

4. A kit as claimed in claim 3 further including replacement brush holders shaped to receive said replacement springs and said replacement brushes.

5. A dynamo electric machine fitted with a kit of the kind defined in claim 1.

6. A brush replacement kit for use with a dynamo electric machine of the kind having a yoke, apertures in the yoke through which brushes of the machine are accessible, and a brush holder assembly for supporting the brushes in a predetermined alignment in relation to a commutator or slip-ring assembly of the machine, the kit comprising replacement brushes of a length exceeding the length of the conventional brushes for the machine, replacement springs for attachment to respective brush holders and engagable in use with outer ends of respective replacement brushes to urge the brushes radially inwardly of the machine in use throughout the increased wear length of the replacement brushes, said replacement springs comprising constant force springs together with clip means for anchoring the constant force springs to a respective brush holder, replacement brush holders shaped to receive said replacement springs and said replacement brushes, and a cover component comprising a cylindrical band for attachment around the exterior of the yoke to close said brush access apertures in use, said band including radially outwardly extending protrusions to be positioned over said apertures of the yoke in use and thereby to accommodate the additional length of the replacement brushes.

7. A dynamo electric machine of the kind having a yoke, apertures in the yoke through which brushes of the machine are accessible, a brush holder assembly for supporting the brushes in a predetermined alignment in relation to a commutator or slip-ring assembly of the machine, brushes of a length exceeding the length of the conventional brushes for the machine, spring arrangements attached to respective brush holders and engaging with outer ends of respective brushes to urge the brushes radially inwardly of the machine in use throughout the increased wear length of the brushes, and a cover component comprising a cylindrical band for attachment around the exterior of the yoke to close said brush access apertures in use, said band including radially outwardly extending protrusions to be positioned over said apertures of the yoke in use and thereby to accommodate the additional length of the brushes.

8. A dynamo electric machine as claimed in claim 7 wherein, said spring arrangements comprise constant force springs together with clip means for anchoring the constant force springs to a respective brush holder, and said brush holders being shaped to receive said constant force springs together with clip means, and said brushes.

* * * * *